United States Patent
Wiesmann

(10) Patent No.: US 9,873,573 B2
(45) Date of Patent: Jan. 23, 2018

(54) SORTING DEVICE FOR PIECE GOODS AND METHOD

(71) Applicant: BEUMER GmbH & Co. KG, Beckum (DE)

(72) Inventor: Thomas Wiesmann, Beckum (DE)

(73) Assignee: BEUMER GMBH & CO. KG, Beckum (DE)

( * ) Notice: Subject to any disclaimer, the term of this patent is extended or adjusted under 35 U.S.C. 154(b) by 0 days.

(21) Appl. No.: 15/350,959

(22) Filed: Nov. 14, 2016

(65) Prior Publication Data

US 2017/0158435 A1 Jun. 8, 2017

(30) Foreign Application Priority Data

Dec. 4, 2015 (EP) ..................................... 15003458

(51) Int. Cl.
*B65G 17/00* (2006.01)
*B65G 35/06* (2006.01)
(Continued)

(52) U.S. Cl.
CPC ................ *B65G 47/52* (2013.01); *B07C 5/36* (2013.01); *B65G 17/345* (2013.01); *B65G 47/962* (2013.01)

(58) Field of Classification Search
None
See application file for complete search history.

(56) References Cited

U.S. PATENT DOCUMENTS

| 4,244,672 A | 1/1981 | Lund |
| 4,917,227 A | 4/1990 | Matsuo et al. |

(Continued)

FOREIGN PATENT DOCUMENTS

| EP | 0272897 A2 | 6/1988 |
| EP | 0556159 B1 | 10/1999 |

OTHER PUBLICATIONS

Search Report issued by the European Patent Office dated May 30, 2016 in co-pending European Patent Application No. 15003458.5.

*Primary Examiner* — Kavel Singh
(74) *Attorney, Agent, or Firm* — Ganz Pollard, LLC

(57) ABSTRACT

Sorting device for piece goods, with several sorting trolleys which are moved to run around a first track, and which are each equipped with a controlled load-receiving element for accepting and delivering piece goods, with at least one infeed station situated adjacent to the first track, at which station piece goods can be supplied to a load-receiving element of a sorting trolley located in the area of the infeed station, and with several uptake trolleys that are moved on a second track, wherein one part of the second track within a handover area for the handover of a piece goods item from a sorting trolley to an uptake trolley is arranged adjacent to a part of the first track, and with a central control unit which receives the positional information for the sorting trolleys on the first track and the uptake trolleys on the second track, and through which a load-receiving element of a selected moving sorting trolley can be controlled for the handover of a piece goods item located on it to a selected moving uptake trolley, at a point in time at which the selected sorting trolley is located within the handover area adjacent to the selected uptake trolley, and a method for sorting using the device.

15 Claims, 1 Drawing Sheet

(51) Int. Cl.
*B65G 47/52* (2006.01)
*B07C 5/36* (2006.01)
*B65G 47/96* (2006.01)
*B65G 17/34* (2006.01)

(56) References Cited

U.S. PATENT DOCUMENTS

| | | |
|---|---|---|
| 5,228,820 A | 7/1993 | Stansfield |
| 5,372,241 A | 12/1994 | Matsumoto |
| 5,547,329 A | 8/1996 | Hirai et al. |
| 6,246,023 B1 * | 6/2001 | Kugle .................. B07C 5/36 104/290 |
| 2005/0256774 A1 | 11/2005 | Clothier et al. |
| 2007/0125727 A1 | 6/2007 | Winkler |

* cited by examiner

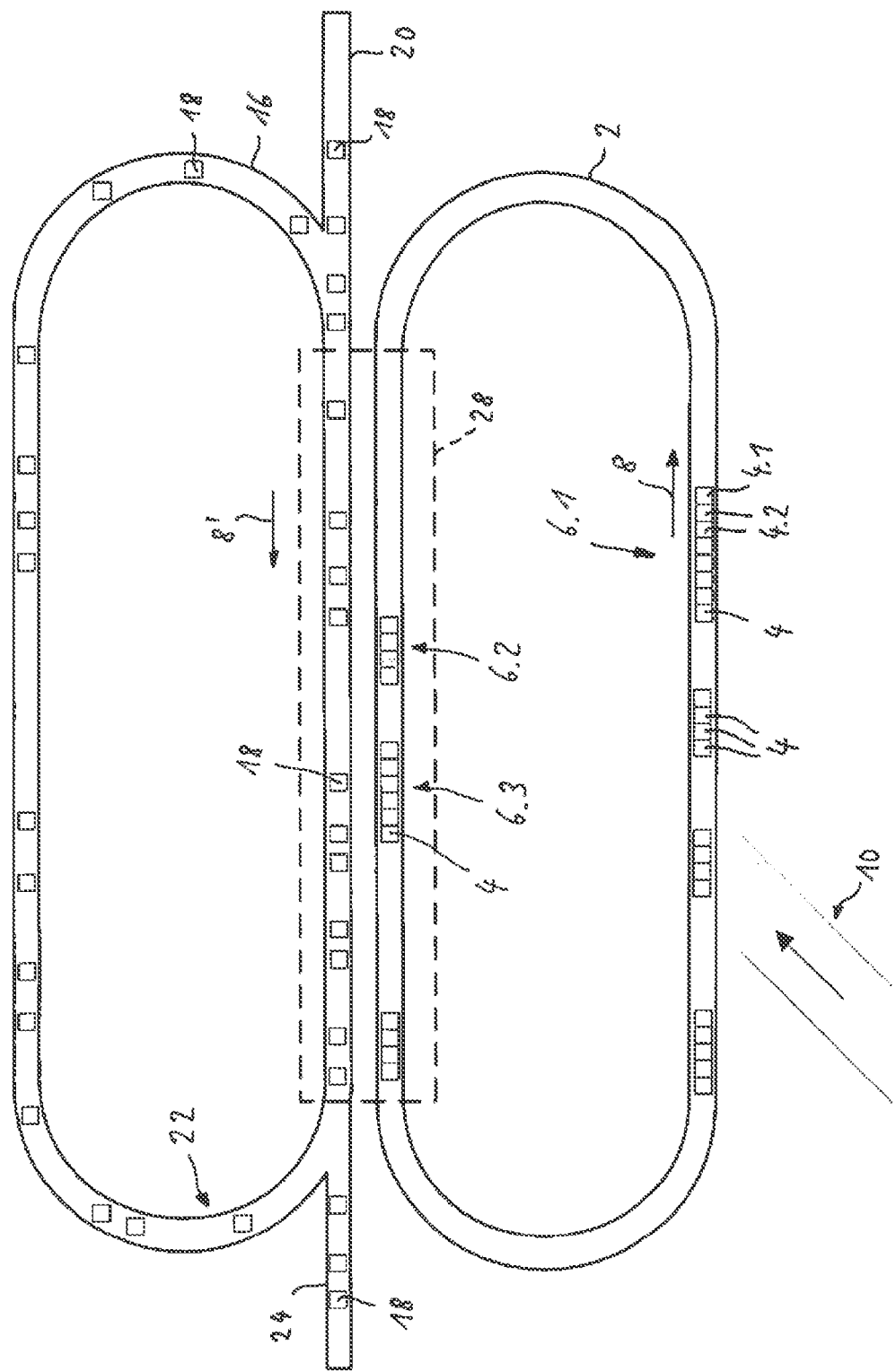

SORTING DEVICE FOR PIECE GOODS AND METHOD

BACKGROUND

The invention relates to a sorting device for piece goods, with several sorting trolleys which are moved to run around a first track, and which are each equipped with a controlled load-receiving element for accepting and delivering piece goods, with at least one infeed station situated adjacent to the first track, at which station piece goods can be supplied to a load-receiving element of a sorting trolley located in the area of the infeed station, and with several uptake trolleys that are moved on a second track, wherein one part of the second track within a handover area for the handover of a piece goods item from a sorting trolley to a moving uptake trolley is arranged adjacent to a part of the first track, such as is known for example from EP 0556159 B1 or WO 93/15986, as well as a method for sorting piece goods using such a device.

In the case of known sorting devices in which piece goods items are transferred by a sorting device with moving sorting trolleys into moving uptake containers or uptake trolleys, a synchronisation of speed between the supplying sorting trolley and the receiving uptake trolley is always envisaged. The reason for this measure lies in the fact that to date, the handover of piece goods items has always taken place at fixed handover points, because sensors, switching elements and the like that are arranged at fixed locations are required in order to reliably ensure the handover of a piece goods item.

SUMMARY

The task of the invention consists in enabling the handover of piece goods items at any desired points within a handover area, without be tied to fixed handover points.

This task is solved by a sorting device of this type, through the measures that a central control unit is provided which receives the positional information for the sorting trolleys on the first track and the uptake trolleys on the second track, and with which a load-receiving element of a selected sorting trolley can be controlled for the purpose of handing over a piece goods item on it to a selected uptake trolley, at a point in time at which the selected sorting trolley is located within the handover area adjacent to the selected uptake trolley. Here, the sorting trolleys within the handover area can be moved at the same speed as or at a different speed from the uptake trolleys. A decision about this is made depending on whether it is expedient to move a sorting trolley within the handover area relative to several uptake trolleys, in order to have the option of being able to hand over a piece goods item from one sorting trolley to a particular one out of several uptake trolleys, or successively to several uptake trolleys, and in fact at the point in time at which the sorting trolley is situated adjacent to the uptake trolley or a selected uptake trolley. If the speed of both trolleys is set to be the same, then a sorting trolley is located within the handover area adjacent to one and the same uptake trolley, so that the exact point in time for handover of a piece goods item is less critical, but only one single uptake trolley is envisaged for the handover.

Thus starting from the positions of the sorting and uptake trolleys, the point in time of the handover is controlled, depending on which the location of the handover results, on the basis of the positions of the sorting trolley and uptake trolleys, which however is not controlled or selected as such, as is the case with a conventional fixed end point or handover point.

It can be envisaged that the first track has horizontal and/or vertical curves. Within the handover area, however, the first and second tracks preferably run on a horizontal plane.

For preference, it is furthermore envisaged that within the handover area, the first track runs parallel to the second track and at a specified distance from it.

The second track can comprise a closed orbital area, within which the handover area is arranged.

The closed orbital area can have intake and outlet points, at which uptake trolleys that are to be loaded can be guided into the orbital area, and laden uptake trolleys can be guided out of the orbital area. Within the handover area, the sorting trolleys preferably move in the same direction as the uptake trolleys.

For expedience, the sorting trolleys are connected to the control unit by means of contactless data transmission, for example by means of circumferential slotted waveguides, leakage waveguides, infrared or radio technology.

It can be envisaged that each load-receiving element of the sorting trolleys and/or each sorting trolley can be activated directly by the control unit. Alternatively, there is the possibility that selected load-receiving elements and/or sorting trolleys can be activated directly by the control unit, as master elements or master trolleys, and other load-receiving elements and/or sorting trolleys are activated indirectly, as slave elements or slave trolleys, via master elements or master trolleys.

Depending on the loading, the sorting trolleys can be moved at variable speeds.

The load-receiving elements of the sorting trolleys are preferably designed as tipping shells or transverse goods conveyors.

The task of the invention is furthermore solved by a method for sorting piece goods using a device according to the invention, wherein one or several piece goods items are allocated a selected uptake trolley as a sorting destination, and the piece goods items or items is/are supplied via the at least one infeed station to one or more sorting trolleys, and is/are handed over to the selected uptake trolley within the handover area.

In order to pick up several piece goods items from one or more sorting trolleys, a selected uptake trolley can be run along the closed orbital area several times. The selected uptake trolley then receives, from several sorting trolleys, in each case one or several piece goods items, until a particular predetermined number of piece goods items has been reached in the uptake trolley. The uptake trolley can then be guided out of the second track.

It can be envisaged that at least the selected sorting trolley is moved faster than the selected uptake trolley.

In relation to the sorting trolleys, there is the possibility that these form a closed sorting trolley train which runs on the first track, or that one or more sorting trolley trains are formed which consist of one or more sorting trolleys and which have spaces between them.

The uptake trolleys can be movable containers on a roller track, mechanically guided transport means or non-mechanically guided trolleys or shuttles.

BRIEF DESCRIPTION OF THE DRAWINGS

FIG. 1 shows a schematic top view onto a sorting device for piece goods according to this invention, which shows a closed first track, a second track with a closed orbital area, as well as a number of sorting trolley trains and uptake trolleys.

DETAILED DESCRIPTION

The invention is described in the following on the basis of an embodiment, wherein reference is made to a drawing, in which FIG. 1 shows a schematic top view onto a sorting device for piece goods according to this invention, which shows a closed first track, a second track with a closed orbital area, as well as a number of sorting trolley trains and uptake trolleys.

The sorting device which is shown in FIG. 1 in a schematic top view comprises in the first instance a first track 2, which is laid out to run all round in a closed manner and on which a series of sorting trolleys 4 are moved to run all round. In the embodiment shown, a series of individual groups 6.1, 6.2, 6.3 etc. of sorting trolleys 4, connected in the manner of a train, are shown, which are coupled to one another at least for the exchange of information signals and which are moved as closed units. A selected sorting trolley, in particular a foremost sorting trolley 4.1, as seen in the direction of travel 8, of each group can be addressed here directly as a master trolley by a superordinated control unit, not shown here, whilst the remaining trolleys 4.2 of a respective group 6.1, 6.2 etc. can be contacted or activated as a slave trolley indirectly by the control unit, via the respective trolley 4.1. The master trolley 4.1 for each group thus receives control information for itself and for the slave trolleys 4.2. that are assigned to it. Alternatively, the control unit could communicate directly with all sorting trolleys.

Each sorting trolley 4 carries at least one load-receiving element, on which one or more piece goods items that are to be sorted can be transported. The load-receiving elements can for example be designed as tipping shells or transverse goods conveyors, so that efficient and careful uptake and handover of piece goods items is possible.

The supply of piece goods items that are to be sorted takes place at at least one infeed station 10, at which for example a feed conveyor or other feed device can be arranged.

The control unit communicates in a wireless manner with the individual sorting trolleys and in particular with the individual load-receiving elements, in order to direct the uptake and handover of individual piece goods items. The communication between control unit and sorting trolley 4 can for example take place in such a way that there is direct communication with a sorting trolley 4.1 of a group 6.1 of sorting trolleys 4, so that the corresponding load-receiving element can be addressed as a master element, and that control signals that are meant for other sorting trolleys 4 of the same group 6.1 are transmitted via the first load-receiving element or master element to the other load-receiving elements or slave elements. Alternatively, each individual load-receiving element could be in direct communication with the control unit.

Each sorting trolley 4 can have its own drive unit, or can be driven via a drive unit, for example a linear drive, that is allocated to the first track, wherein the drive unit can be controlled by the control unit.

The sorting device furthermore comprises a second track 16, on which uptake trolleys 18 can be moved in a direction of travel 8'. Each uptake trolley 18 serves to take over one or more piece goods items from one or several sorting trolleys 4 that circulate on the first track 2. Empty uptake trolleys 18, or trolleys that are to be laden, can be introduced into a closed orbital area 22 of the second track 16 via an intake point 20, and laden uptake trolleys can be guided out of the orbital area 22 via an outlet point 24. The uptake trolleys can have their own drive unit or can be driven via a drive unit, for example a linear drive, that is allocated to the second track, wherein the drive unit can be controlled by the control unit.

Within a handover area 28, a part of the first track 2 runs adjacent to a part of the second track 16, wherein within the handover area 28 the first track 2 in particular runs parallel to and at a predetermined distance from the second track 16. The direction 8' is chosen such that the sorting trolleys 4 and the uptake trolleys 18 move in the same direction within the handover area 28.

The distance between the first and second tracks is chosen such that a piece goods item that is to be handed over can be handed over from a load-receiving element of a selected sorting trolley 4 to a selected uptake trolley 18, in response to a corresponding signal from the control unit at a point in time at which the selected sorting trolley is located adjacent to the selected uptake trolley. An adjacent position of an uptake trolley in relation to a sorting trolley means in particular that, as seen crosswise to the direction of travel, the sorting trolley is situated at the same level as the uptake trolley.

The method for sorting piece goods using the device proceeds as follows. Via the infeed station 10, a series of piece goods items that are to be sorted, i.e. to be supplied to selected uptake trolleys 18, are supplied to one or more sorting trolleys 4. At the same time, a series of uptake trolleys 18 are circulating on the second track 16, or—to be exact—within the orbital area 22. The central control unit continually receives positional information regarding the position of the load-receiving elements of each individual sorting trolley 4 and the position of each individual uptake trolley 18. In order to ensure coinciding positions of a particular sorting trolley 4 or its load-receiving element with a particular uptake trolley 18 within the handover area 28, if necessary the control unit can alter the speed of the uptake trolleys and/or the sorting trolleys, for example in order to prevent a particular sorting trolley from just missing a particular uptake trolley. Otherwise, the corresponding uptake trolley and/or corresponding sorting trolley executes another circuit on the second or first track.

A handover of a particular piece goods item from a selected sorting trolley to a selected uptake trolley can take place within the handover area as soon as both trolleys are situated at coinciding positions, or immediately adjacent to one another, for example, at the same level as seen crosswise to the direction of travel, or slightly offset to one another when taking into account a speed difference between sorting trolley and uptake trolley, so that an optimum handover of a piece goods item is possible, taking into account a "flight path" of a piece goods item for handing over, if applicable.

At the desired point in time for the handover, the control unit sends a corresponding signal to the sorting trolley in question, or to its load-receiving element, so that the handover of the piece goods item is triggered. Here, the precise location of the handover results in a sense automatically, wherein what is important is not the place of handover, but what matters is only the fact that both trolleys involved are located within the handover area at coinciding positions. The handover points are therefore not locationally fixed, but result more or less randomly from the handover time that is determined by the control unit on the basis of the movement data of the trolleys involved, so that one can speak of dynamic end points or handover points.

If several piece goods items are to be transferred into one and the same uptake trolley, as a rule this is carried out such that the uptake trolley is run along the orbital area 22 several times, and in one or each pass through the handover area, it receives a piece goods item from one sorting trolley, as a rule each time from a different one. Once all the piece goods items have been supplied, the thus laden uptake trolley is guided out of the orbital area 22 via the outlet point 24.

The invention claimed is:

1. A sorting device for piece goods, the sorting device, comprising several sorting trolleys which are moved to run around a first track, and which are each equipped with a controlled load-receiving element for accepting and delivering piece goods, with at least one infeed station situated adjacent to the first track, at which station piece goods can be supplied to a load-receiving element of a sorting trolley located in the area of the infeed station, and with several uptake trolleys that are moved on a second track, wherein one part of the second track within a handover area for the handover of a piece goods item from a sorting trolley to an uptake trolley is arranged adjacent to a part of the first track, and with a central control unit which receives the positional information for the sorting trolleys on the first track and the uptake trolleys on the second track, and through which a load-receiving element of a selected moving sorting trolley can be controlled for the handover of a piece goods item located on it to a selected moving uptake trolley, at a point in time at which the selected sorting trolley is located within the handover area adjacent to the selected uptake trolley.

2. The sorting device according to claim 1, characterised in that the sorting trolleys can be moved within the handover area at the same speed as or a different speed from the uptake trolleys.

3. The sorting device according to claim 1, characterised in that the first track has horizontal and/or vertical curves.

4. The sorting device according to claim 1, characterised in that the first and second tracks run on a horizontal plane within the handover area.

5. The sorting device according to claim 1, characterised in that within the handover area, the first track runs parallel to and at a predetermined distance from the second track.

6. The sorting device according to claim 1, characterised in that the second track comprises a closed orbital area, within which the handover area is arranged.

7. The sorting device according to claim 6, characterised in that the orbital area has intake and outlet points, at which uptake trolleys that are to be loaded can be introduced into the orbital area and laden uptake trolleys can be guided out of the orbital area.

8. The sorting device according to claim 1, characterised in that the sorting trolleys are connected to the control unit by means of contactless data transmission.

9. The sorting device according to claim 1, characterised in that each load-receiving element or each sorting trolley can be activated directly by the control unit.

10. The sorting device according to claim 1, characterised in that selected sorting trolleys can be activated directly by the control unit as master trolleys, and other sorting trolleys can be activated indirectly as slave trolleys, via master trolleys.

11. The sorting device according to claim 1, characterised in that the sorting trolleys can be moved at variable speeds, depending on loading.

12. The sorting device according to claim 1, characterised in that the load-receiving elements of the sorting trolleys are designed as tilting shells or transverse belt conveyors.

13. A method for sorting piece goods using a sorting device comprising:
    moving several sorting trolleys which are moved to run around a first track, and which are each equipped with a controlled load-receiving element for accepting and delivering piece goods, with at least one infeed station situated adjacent to the first track, at which station piece goods can be supplied to a load-receiving element of a sorting trolley located in the area of the infeed station, and with several uptake trolleys that are moved on a second track, wherein one part of the second track within a handover area for the handover of a piece goods item from a sorting trolley to an uptake trolley is arranged adjacent to a part of the first track, and with a central control unit receiving the positional information for the sorting trolleys on the first track and the uptake trolleys on the second track, and through which a load-receiving element of a selected moving sorting trolley can be controlled for the handover of a piece goods item located on it to a selected moving uptake trolley, at a point in time at which the selected sorting trolley is located within the handover area adjacent to the selected uptake trolley; and
    wherein allocating one or more piece goods items to a selected uptake trolley as a sorting destination, supplying the piece goods item or items, via the at least one infeed station, to one or more sorting trolleys, and handing over the one or more piece goods items to the selected uptake trolley within the handover area.

14. The method according to claim 13, characterised in that in order to take up several piece goods items from one or more sorting trolleys, a selected uptake trolley is run several times along a second track comprising a closed orbital area, within which the handover area is arranged.

15. The method according to claim 13, characterised in that at least the selected sorting trolley is moved faster or slower than the selected uptake trolley.

* * * * *